(12) United States Patent
Hasan et al.

(10) Patent No.: US 12,741,642 B2
(45) Date of Patent: Sep. 22, 2026

(54) VEHICLE WITH DRIVER ASSISTANCE IMPACT LOAD REDUCTION FOR ABRUPT ROADWAY GRADE CHANGES

(71) Applicant: GM GLOBAL TECHNOLOGY OPERATIONS LLC, Detroit, MI (US)

(72) Inventors: Md Abir Hasan, Troy, MI (US); Abu Ashraf, Troy, MI (US); Patrick J Monsere, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 18/792,243

(22) Filed: Aug. 1, 2024

(65) Prior Publication Data

US 2026/0034986 A1 Feb. 5, 2026

(51) Int. Cl.
*B60W 30/14* (2006.01)
*B60W 40/06* (2012.01)

(52) U.S. Cl.
CPC .......... *B60W 30/146* (2013.01); *B60W 40/06* (2013.01); *B60W 2420/403* (2013.01); *B60W 2552/00* (2020.02); *B60W 2720/106* (2013.01)

(58) Field of Classification Search
CPC .... B60W 10/184; B60W 10/22; B60W 30/00; B60W 30/025; B60W 30/143; B60W 30/146; B60W 40/06; B60W 50/00; B60W 50/0097; B60W 2050/0002; B60W 2400/00; B60W 2420/403; B60W 2510/18; B60W 2510/22; B60W 2520/10; B60W 2552/00; B60W 2552/20; B60W 2552/35; B60W 2554/00; B60W 2555/60;
(Continued)

(56) References Cited

U.S. PATENT DOCUMENTS

2008/0015743 A1* 1/2008 Haug .......................... B60T 7/22 701/1
2008/0059021 A1* 3/2008 Lu ......................... B60G 17/0195 701/36
(Continued)

FOREIGN PATENT DOCUMENTS

| DE | 102009003216 A1 | 11/2010 |
|---|---|---|
| DE | 102013220931 A1 | 4/2015 |
| DE | 102016222151 A1 | 6/2022 |

*Primary Examiner* — Peter D Nolan
*Assistant Examiner* — Ce Li Li
(74) *Attorney, Agent, or Firm* — Ingrassia Fisher & Lorenz, LLP | IFL

(57) ABSTRACT

A method includes automatically monitoring a path in proximity to a vehicle to detect an abrupt grade change along the path and ahead of the vehicle. The grade change is determined to be abrupt depending on a predetermined threshold of a minimum change in grade height. Upon receiving, by processor circuitry forming at least one processor, indication that an abrupt grade change exists, the method determines a time or distance or both from a position of the vehicle to the abrupt change. The method then determines, by the processor, a target speed the vehicle is to use to travel over the abrupt grade change using predetermined correlations between a target speed of the vehicle and an indicator of expected comfort of an occupant of the vehicle as the vehicle travels over the abrupt grade change. The vehicle is decelerated to the target speed to drive over the abrupt grade change.

18 Claims, 8 Drawing Sheets

(58) Field of Classification Search
CPC ......... B60W 2556/00; B60W 2556/50; B60W 2720/10; B60W 2720/106
See application file for complete search history.

(56) References Cited

U.S. PATENT DOCUMENTS

| | | | | |
|---|---|---|---|---|
| 2008/0100129 | A1* | 5/2008 | Lubbers | B60L 7/18 303/113.1 |
| 2009/0040037 | A1* | 2/2009 | Schraga | B60W 30/09 340/459 |
| 2011/0199198 | A1* | 8/2011 | Yang | B60R 1/24 340/426.25 |
| 2012/0323403 | A1* | 12/2012 | Okita | B60W 50/14 701/1 |
| 2014/0163837 | A1* | 6/2014 | Um | B60W 30/143 701/93 |
| 2015/0046084 | A1* | 2/2015 | Choi | G01C 21/3697 701/468 |
| 2015/0084755 | A1* | 3/2015 | Chen | B60R 1/27 340/435 |
| 2017/0106855 | A1* | 4/2017 | Lavoie | B60W 10/184 |
| 2019/0001965 | A1* | 1/2019 | Cho | B60W 30/025 |
| 2020/0130686 | A1* | 4/2020 | Kim | G06V 20/582 |
| 2021/0179147 | A1* | 6/2021 | Kang | B60W 30/18054 |
| 2022/0410803 | A1* | 12/2022 | Marsolek | B60R 1/23 |
| 2023/0202473 | A1* | 6/2023 | Shalev-Shwartz | B60W 30/146 701/93 |
| 2023/0347888 | A1* | 11/2023 | Ueno | G08G 1/165 |
| 2024/0066984 | A1* | 2/2024 | Oh | B60W 30/025 |
| 2024/0351598 | A1* | 10/2024 | Jung | B60W 30/146 |
| 2024/0391478 | A1* | 11/2024 | Jung | B60W 50/085 |
| 2024/0427015 | A1* | 12/2024 | Poepperl | G01S 15/878 |

* cited by examiner

VEHICLE WITH DRIVER ASSISTANCE IMPACT LOAD REDUCTION FOR ABRUPT ROADWAY GRADE CHANGES

INTRODUCTION

The present disclosure relates to vehicles with autonomous driving features, and more particularly, driver assistance impact load reduction while driving over abrupt roadway grade changes.

Many modern vehicles have at least some aspects of autonomous driving, such as automatic braking and speed control. Improvements continue to be made by using such automatic driver assistance features to provide both the driver and passengers (e.g., riders or occupants) in a vehicle a smoother ride despite uneven or bumpy road conditions, and particularly when driving from a driveway, over a relatively high curb, and onto a road.

BRIEF SUMMARY

In an example implementation, a method includes automatically monitoring a path in proximity to a vehicle to detect an abrupt grade change along the path and ahead of the vehicle. The grade change is determined to be abrupt depending on a predetermined threshold of a minimum change in grade height. Upon receiving, by processor circuitry forming at least one processor, indication that an abrupt grade change exists, the method determines a time or distance or both from a position of the vehicle to the abrupt grade change. The method then determines, by the processor, a target speed the vehicle is to use to travel over the abrupt grade change using predetermined correlations between a target speed of the vehicle and an indicator of expected comfort of an occupant of the vehicle as the vehicle travels over the abrupt grade change. The method then determines, by the processor, whether a current speed of the vehicle is below the target speed, and automatically decelerates, by the processor, the vehicle so that the vehicle travels over the abrupt grade change at or below the target speed when the current speed is above the target speed.

Also in accordance with another example implementation, the correlations depend on subjective tests with at least one person indicating comfort or discomfort levels depending on the target speed and abrupt grade change heights.

Also in accordance with another example implementation, the correlations depend on force sensor measurements at seats in a vehicle or on dummies on seats in the vehicle tested at different abrupt grade change heights and target speeds.

Also in accordance with another example implementation, the correlations are between a target speed and a change in grade height.

Also in accordance with another example implementation, the method includes detecting the abrupt grade change by using one or more cameras or an advanced driver assistance system (ADAS).

Also in accordance with another example implementation, the method includes detecting the abrupt grade change by using an inertial measurement unit (IMU) and suspension sensors that measure a change in height of a suspension at a wheel of the vehicle.

Also in accordance with another example implementation, the method includes automatically maintaining a current speed of the vehicle when the current speed is below the target speed.

Also in accordance with another example implementation, the method includes displaying an alert to an occupant of the vehicle when the abrupt grade change is detected or when the automatic deceleration is to be performed or both.

Also in accordance with another example implementation, the method includes setting and executing a brake blend deceleration between a current speed of the vehicle and the target speed sufficient to attempt to provide a smooth transition from a current vehicle position to a vehicle position over the grade change.

In another example implementation, a computing device includes memory storing predetermined correlations between a target speed of a vehicle and an indicator of expected comfort of an occupant of the vehicle as the vehicle travels over an abrupt grade change. Processor circuitry forms one or more processors being communicatively coupled to the memory, while the processor is to operate by: automatically monitoring a path in proximity to the vehicle to detect the abrupt grade change along the path and ahead of the vehicle. The grade change is determined to be abrupt depending on a predetermined threshold of a minimum change in grade height. Upon receiving indication that an abrupt grade change exists, the processor determines a time or distance or both from a position of the vehicle to the abrupt change, and determines a target speed the vehicle is to use to travel over the abrupt grade change using the predetermined correlations. The processor then operates by determining whether a current speed of the vehicle is below the target speed. The processor then automatically decelerates the vehicle so that the vehicle travels over the abrupt grade change at or below the target speed when the current speed is above the target speed.

Also in accordance with another example implementation, the processor is arranged to operate by: reverting back to a non-abrupt grade change mode when the processor detects an end of a wheelbase of the vehicle passed over the abrupt grade change.

Also in accordance with another example implementation, the monitoring includes alternatively using both an optical device to analyze images of the path up ahead and using an inertial measurement unit (IMU) and suspension sensors to detect when the vehicle is on a location of the abrupt grade change.

Also in accordance with another example implementation, the monitoring includes analyzing suspension sensors so that a change in suspension height at any single wheel of the vehicle is detected.

Also in accordance with another example implementation, the processor further operates by displaying the target speed on a display device on the vehicle and to a driver of the vehicle and informing the driver to maintain the target speed or less.

In another example implementation, a vehicle includes one or more controllers including: memory and processor circuitry forming one or more processors communicatively coupled to the memory. The processor is to operate by: automatically monitoring a path in proximity to the vehicle to detect an abrupt grade change along the path and ahead of the vehicle. The grade change is determined to be abrupt depending on a predetermined threshold of a minimum change in grade height. Upon receiving indication that an abrupt grade change exists, the processor operates by determining a time or distance or both from a position of the vehicle to the abrupt change, and determining a target speed the vehicle is to use to travel over the abrupt grade change using predetermined correlations between a target speed of the vehicle and an indicator of expected comfort of an occupant of the vehicle as the vehicle travels over the abrupt grade change. The processor also operates by determining whether a current speed of the vehicle is below the target speed, and automatically decelerating the vehicle so that the vehicle travels over the abrupt grade change at or below the target speed when the current speed is above the target speed.

Also in accordance with another example implementation, the decelerating includes automatically generating a deceleration profile set to be a uniform deceleration rate from a current speed of the vehicle to the target speed.

Also in accordance with another example implementation, the decelerating includes automatically generating a deceleration profile varied to attempt to avoid sudden stops and jolts of the vehicle.

Also in accordance with another example, the setting of the target speed or deceleration includes factoring a position of the underbody of the vehicle.

Also in accordance with another example implementation, the monitoring is automatically enabled once the vehicle is turned on and whether or not the vehicle is in motion.

Also in accordance with another example implementation, the monitoring is automatically enabled when the vehicle is put in motion.

BRIEF DESCRIPTION OF THE DRAWINGS

The present disclosure will hereinafter be described in conjunction with the following figures. The figures are not to scale and numerals in the figures denote like elements, and where.

DETAILED DESCRIPTION

The following detailed description merely presents example implementations and is not intended to limit the disclosure or the application and uses thereof. Furthermore, no intention exists to be bound by any theory presented in the preceding background or the following detailed description.

Figure 1:
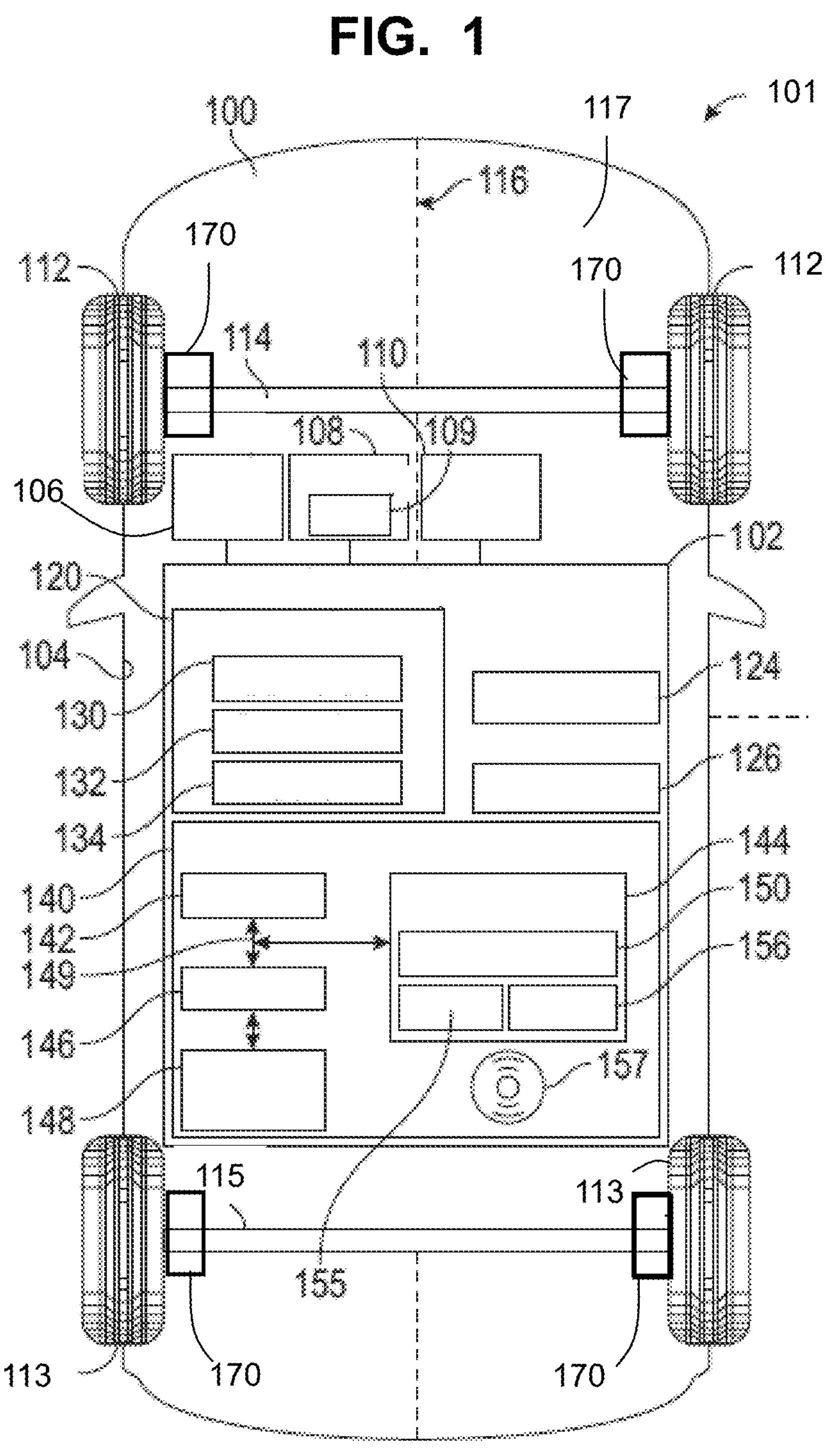
FIG. 1 is a schematic diagram of an example vehicle with a system to reduce an impact load due to driving over abrupt grade changes in a roadway according to at least one of the implementations herein.

Referring to FIG. 1, a system 101 includes one or more vehicles 100 each to perform driver assistance impact load reduction for abrupt roadway grade changes. In various implementations, the system 101 performs these tasks in accordance with a process 300 (FIG. 3) and the sub-processes and implementations thereof of FIGS. 4-5, in accordance with example implementations described herein. It should be noted that the term roadway (or road or path) is meant in a general sense herein to include any path that will be driven over by a vehicle including a driveway and a curb between a driveway and a street for example.

Specifically, as described in greater detail further below, in various implementations, the vehicle 100 has a controller 140 (or computer system) with processor circuitry that forms at least one processor 142 and a memory 144 that stores programs 150 including software and/or firmware that performs impact load reduction at detected abrupt grade changes as described in detail below.

By one example form, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain implementations such as trucks with more than four wheels, and so forth. In certain implementations, the vehicle 100 may also comprise any other motorized vehicle with cameras and/or sensors that can at least detect an abrupt grade change, but in most cases also at least has an autonomous brake control.

In some implementations, the vehicle 100 may be operated in whole or in part by a human driver, or alternatively may comprise an autonomous or semi-autonomous vehicle, for example in which vehicle control (including acceleration, deceleration, braking, and/or steering) is automatically planned and executed by a control system 102 of the vehicle 100, in whole or in part. In addition, the vehicle 100 may be operated by a human at certain times and via automated control at other times. Thus, the vehicle 100 includes one or more functions that may be controlled automatically via the control system 102 to provide driver assistance features.

Also, the example vehicle 100 includes a body 104 that is arranged on a chassis 117 and has a longitudinal central axis 116. The body 104 substantially encloses other components of the vehicle 100. The body 104 and the chassis 117 may jointly form a frame. The vehicle 100 also includes a plurality of wheels including front wheels 112 and rear wheels 113. The wheels 112 and 113 are each rotationally coupled to the chassis 117 near a respective corner of the body 104 to facilitate movement of the vehicle 100.

A drive system 110 is mounted on the chassis 117, and drives the wheels 112 and/or 113, for example via front and rear axles 114 and 115, respectively. A wheelbase W (see FIG. 6) is defined along the central axis 116 from the center of the front axle 114 to the center of the rear axle 115. The drive system 110 preferably comprises a propulsion system. In certain example implementations, the drive system 110 comprises an internal combustion engine and/or an electric motor/generator, coupled with a transmission thereof. In certain implementations, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

By some forms, the vehicle 100 also includes a braking system 106 and a steering system 108 in various implementations. In example implementations, the braking system 106 controls braking of the vehicle 100 using braking components that are controlled via inputs provided by a driver (e.g., via a braking pedal in certain implementations) and/or automatically via the control system 102. Also in example implementations, the steering system 108 controls steering of the vehicle 100 via steering components (e.g., a steering wheel 109 that is part of a steering column coupled to the axle 114 and/or the front wheels 112) that are controlled via inputs provided by a driver (e.g., via the steering wheel 109 in certain implementations) and/or automatically via the control system 102.

By one approach, the control system 102 is coupled to the braking system 106, the steering system 108, and the drive system 110. In various implementations, the control system 102 at least facilitates the generating and processing of observational data on camera images or detected by other sensors for the vehicle 100 and/or for other vehicles. In addition, in certain implementations in which the vehicle 100 is an autonomous or semi-autonomous vehicle, the control system 102 also provides in certain circumstances control over automated features of the vehicle 100 (including automated operation of the braking system 106, the steering system 108, and/or the drive system 110), including using one or more models that are trained using the observational data.

As depicted in FIG. 1, in various implementations, the control system 102 includes a sensor array 120, a display 124, a transceiver 126, and the controller 140. By one example, the sensor array 120 obtains sensor data for generating the observational data. In various implementations, the sensor array 120 includes one or more cameras 130 (such as video cameras and/or still image cameras). Also in some examples, the sensor array 120 may also include one or more other detection sensors 132 (e.g., radar, sonar, light detection and ranging (LIDAR), infrared, or the like) and/or other sensors 134 (e.g., vehicle position sensors, speed sensors, accelerometers, gyroscopes, inertial sensors, braking sensors, steering sensors, suspension sensors, and so on). Suspension sensors used herein may be suspension height sensors or rotary position sensors with a linkage that connects to the suspension.

By one form, each wheel 112 and 113 has a suspension system 170 with suspension components (or just a suspension) such as cylinders, pistons, springs, hydraulics, and so forth that attenuate impact loads from the wheels. Such impact loads propagate through the suspension systems 170 and chassis 177, and then in turn to seats in the vehicle 100, which can be felt by occupants in the seats. The suspension systems 170 each also may have one or more of the suspension height sensors 134 that indicate a change in height of the suspensions as the suspensions expand or contract due to the height of a grade change in the road. Thus, this in turn can indicate a corresponding change in height of a wheel 112 or 113 relative to the chassis 117, and therefore indicate the height of a grade change.

In various implementations, the vehicle cameras 130 used to obtain images of the observational data of the road may include front, rear, side, and/or surround-view cameras including wide angle, 360 degree, and/or fish-eye lens cameras, as well as monocular, stereo, infrared, time-of-flight, thermal, LIDAR cameras, and so forth. These cameras 130 may capture images that are then processed by object detection algorithms that may be used to detect and measure a roadway (also referred to herein as a road or path) on which the vehicle 100 is operating and is able to detect shape and size (e.g., dimensions) of road surfaces, including curbs and other non-flat objects on or near a roadway, as well as other objects. Such imaging systems also measures distances from the vehicle 100 to road surfaces, and positions and movement of pedestrians, vehicles, drivers, and various other details of the roadway and activity pertaining thereto. In various implementations, video camera images are obtained. Additionally or alternatively, still camera images may be obtained.

By some examples, images captured by the cameras 130 are analyzed by one or more processors 142 to perform object detection and recognition algorithms such as those based on any one or more algorithms of: machine learning, neural networks, Convolutional Neural Networks (CNNs), Region-Based Convolutional Neural Networks (R-CNN), Recurrent Neural Networks (RNNs), Mask R-CNNs, You Only Look Once (YOLO), Single Shot MultiBox Detector (SSD), Semantic Segmentation such as Fully Convolutional Networks (FCNs) and U-Nets, for example, Haar Cascades (Viola-Jones (VJ) Detector), Histogram of Oriented Gradients (HOG), MOG (Mixture of Gaussians) background subtraction, Scale-Invariant Feature Transform (SIFT), Speeded-Up Robust Features (SURF), template matching, DPM (Deformable Parts Model), GMM (Gaussian Mixture Model) background subtraction, LDA (Linear Discriminant Analysis), and/or many others.

In various implementations, the detection sensors 132 and/or other sensors 134 obtain additional information as to the roadway and/or the operation of the vehicle 100 itself (e.g., position, speed, deceleration and/or acceleration thereof, and so on) for use in operating the vehicle 100, for example in accordance with autonomous operation of the vehicle 100 and/or of certain components thereof. This may include radar sensors, ultrasonic, and other types of sensors as well as inertial measurement units (IMUs) that can detect the motion and orientation of a vehicle, such as a pitch angle forward and back and roll angle from side to side. As explained below, the IMU in conjunction with suspension measurements can be used in addition to, or alternatively to, a camera-based system to detect an abrupt grade change.

By one example form, and rather than using cameras 130 alone to detect objects, and particularly the shape of a road (including curbs and so forth), the cameras 130 are used as part of an advanced driver assistance system (ADAS) or similar system that uses both optics and the other detection sensors 132 and other sensors 134 to detect curbs or other significant irregular shapes on the road. Thus for example, data collected from camera images, radar, LiDAR, and ultrasonic sensors can be used together to detect abrupt grade changes in a road. This may include performing sensor fusion and machine learning or neural network models that receive input from a variety of sensors rather than image data alone, as well as other techniques.

In the present example, the vehicle 100 also includes a transceiver 126 to communicate with remote systems, servers, devices, modules, or units. Thus, any one or more parts or components (or units) of the control system 102 and/or controller 140 that performs processing for any of the operations described herein related to reducing impact loads from abrupt grade changes can be performed remotely when desired. Specifically, in various implementations, the controller 140 (and, in certain implementations, the control system 102 itself) is disposed within the body 104 of the vehicle 100. In one implementation, the control system 102 is mounted on the chassis 117. In certain implementations, the controller 140 and/or control system 102 and/or one or more components thereof may be disposed outside the body 104, for example on a remote server, in the cloud, or other device where image processing is performed remotely. It will be appreciated that the control system 102 and/or the controller 140 may otherwise differ from the implementation depicted in FIG. 1. For example, the controller 140 may be coupled to, or may otherwise utilize, one or more remote computer systems and/or other control systems, for example as part of one or more of the above-identified vehicle 100 devices and systems.

Also, the control system 102 may have a display on the vehicle 100 that can provide messages to occupants of the vehicle 100, such as alerts when an abrupt grade change is detected and/or when the load impact reduction system (FIG. 2) automatically controls the brake system 106 to reduce impact load at the abrupt grade change. The display 124 may be any that can provide a screen for an occupant or user in the vehicle to see the images on the display 124. Such a display may be a digital display, a graphical user interface (GUI), an LED display, a plasma display, an LCD display, an organic light emitting diode (OLED) display, a thin-film transistor (TFT) display, heads up display (HUD), 3D displays, holographic displays, virtual or augmented displays, and so forth.

In various implementations, the controller 140 is coupled to the sensor array 120, as well as to the braking system 106, the steering system 108, and the drive system 110. In various implementations, the controller 140 is also coupled to the display 124 and the transceiver 126.

In various implementations, the controller 140 comprises, or is, a computer system, and includes the processor 142, the memory 144, an interface 146, a storage device 148, and a computer bus 149. In various implementations, the controller (or computer system) 140 obtains sensor data from the sensor array 120, and in certain implementations additional data via the transceiver 126. In various implementations, the controller 140 processes the observational data, including images of a roadway up ahead on an expected path of the vehicle 100. In certain implementations, the controller 140 also uses the observational data for developing, training, and/or implementing one or more autonomous driving models for the vehicle 100 (e.g., for automated control of the braking system 106, steering system 108, and/or drive system 110). In various implementations, the controller 140 provides these and other functions in accordance with the steps of the processes and implementations depicted in FIGS. 3-5 and as described further below in connection therewith.

In the depicted implementation, the controller 140 (or computer system) includes the processor 142 to perform the computation and control functions of the controller 140, and may comprise circuitry or circuits that form any type of processor or multiple processors, single integrated circuits such as a microprocessor, or any suitable number of integrated circuit devices and/or circuit boards working in cooperation to accomplish the functions of a processing unit. This may include a System on a chip (SOC) and one or more processor cores. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 3-5 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted implementation, the memory 144 stores the above-referenced program 150 along with one or more databases 155 (e.g., pertaining to correlations of occupant comfort with target speed and other data related to impact load reduction) and other stored values 156. The memory 144 also may store thresholds that are to be used for impact load reduction at detected abrupt grade changes in the database 155 as described further below.

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one implementation, the interface 146 obtains the various data from the sensor array 120 and/or the navigation system 122. The interface 146 can include one or more network interfaces to communicate with other systems or components.

The storage device 148 can be any suitable type of storage apparatus, including various different types of direct access storage and/or other memory devices. In one example implementation, the storage device 148 comprises a program product from which memory 144 can receive the program 150 that executes one or more implementations of the processes and implementations of FIGS. 3A-3B and as described further below in connection therewith. In another example implementation, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this example implementation is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the controller 140 may also otherwise differ from the implementation depicted in FIG. 1, for example in that the computer system of the controller 140 may be coupled to or may otherwise utilize one or more remote computer systems and/or other control systems.

Figure 2:
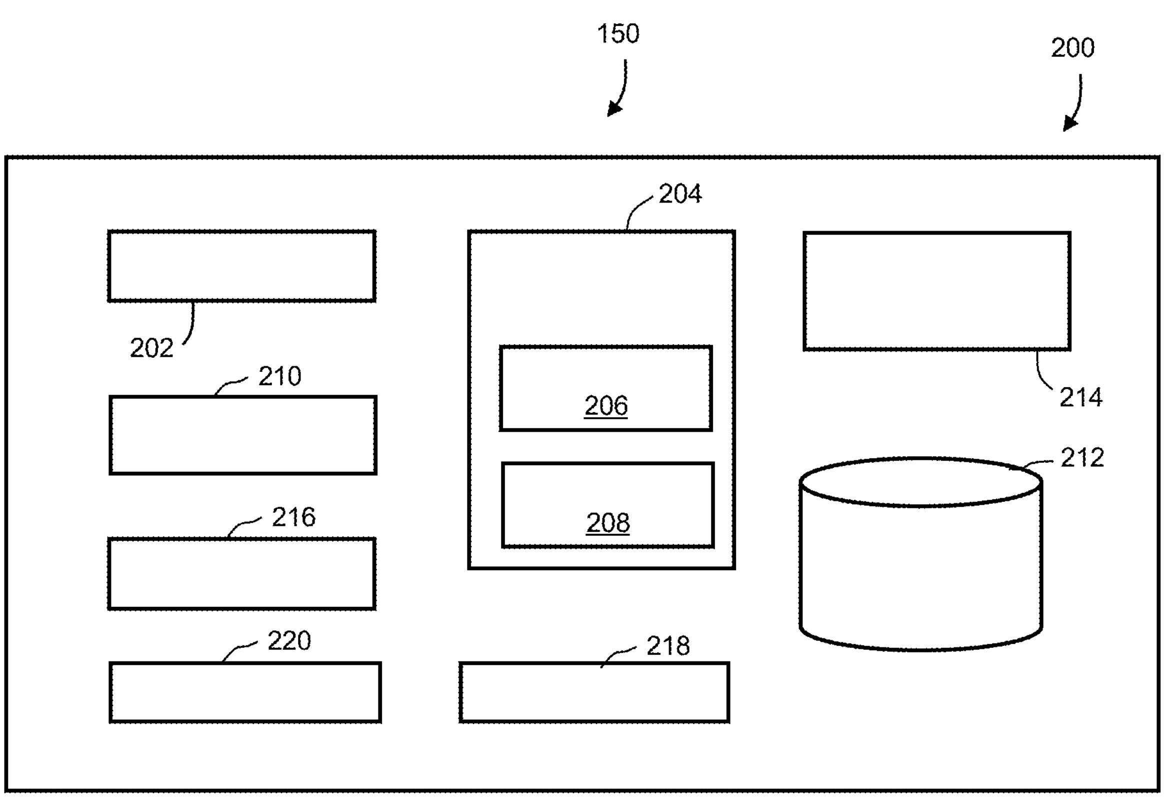
FIG. 2 is a schematic diagram of an example impact load reduction system program of FIG. 1 and according to at least one of the implementations herein.

Referring to FIG. 2, an impact load reduction system 200 may be a program 150 that has units (also referred to as modules or components) that may be formed of any combination of software and/or firmware operated by processors 142 formed by hardware circuits described above. The hardware circuits may be shared hardware such as with a central processing unit (CPU), digital signal processor (DSP), and so forth. Otherwise, dedicated or specific function processors may be provided that operate neural networks and other structures for image processing for example, such as with graphical processing units (GPUs) or image signal processors (ISPs).

In the present example, the impact load reduction (ILR) system 200 has an activation unit 202, an abrupt grade change detection unit 204 that may have a camera unit 206, an IMU unit 208, or both. The ILR system 200 also may have a target speed unit 210, a correlation database 212, a travel prediction unit 214, a deceleration unit 216, an alert unit 218, and an auto brake unit 220. The operation of these units is described below with process 300.

Figure 3A:
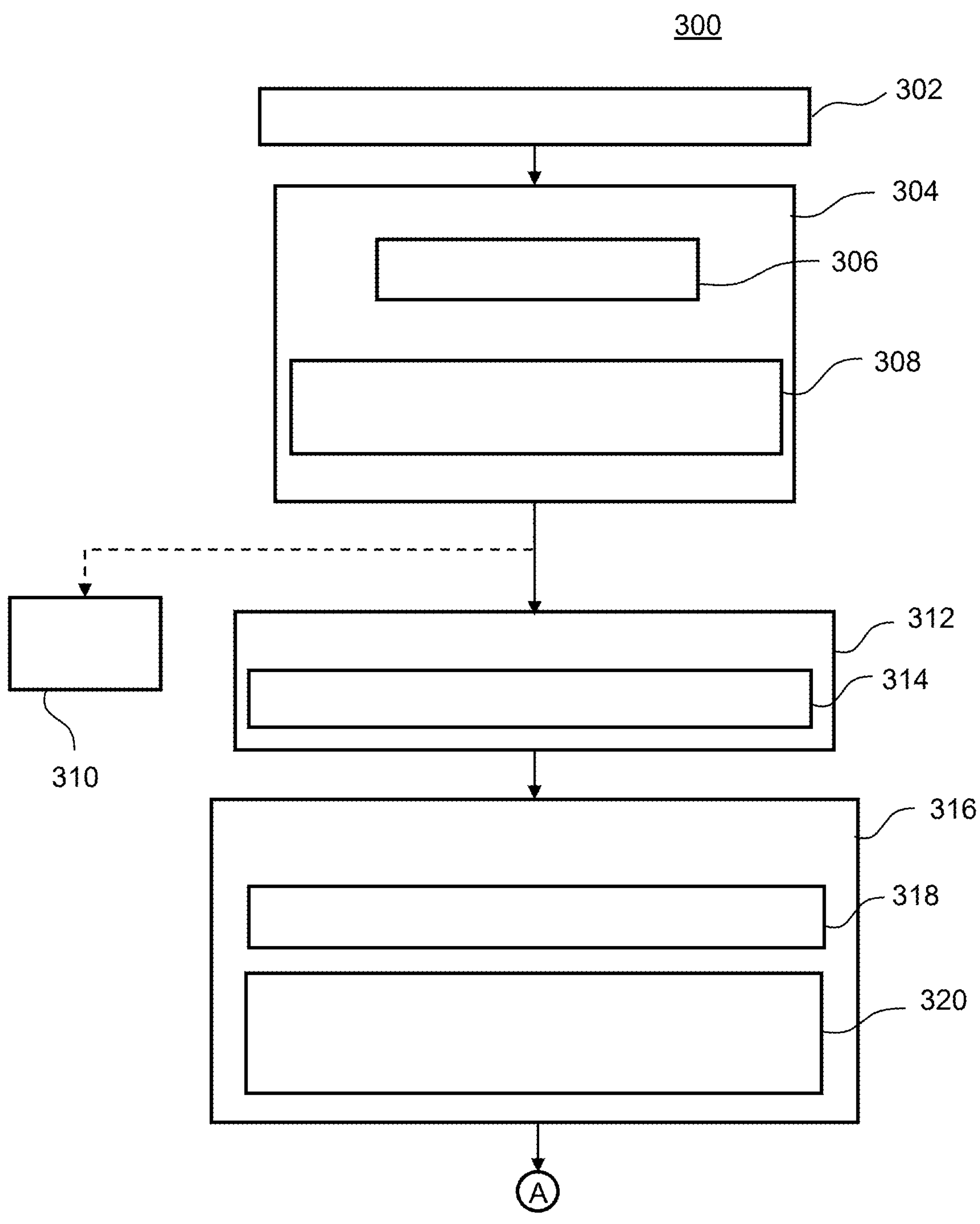
FIGS. 3A-3B is an example flow chart of a method of reducing an impact load due to abrupt grade changes in a roadway according to at least one of the implementations herein.
Figure 3B:
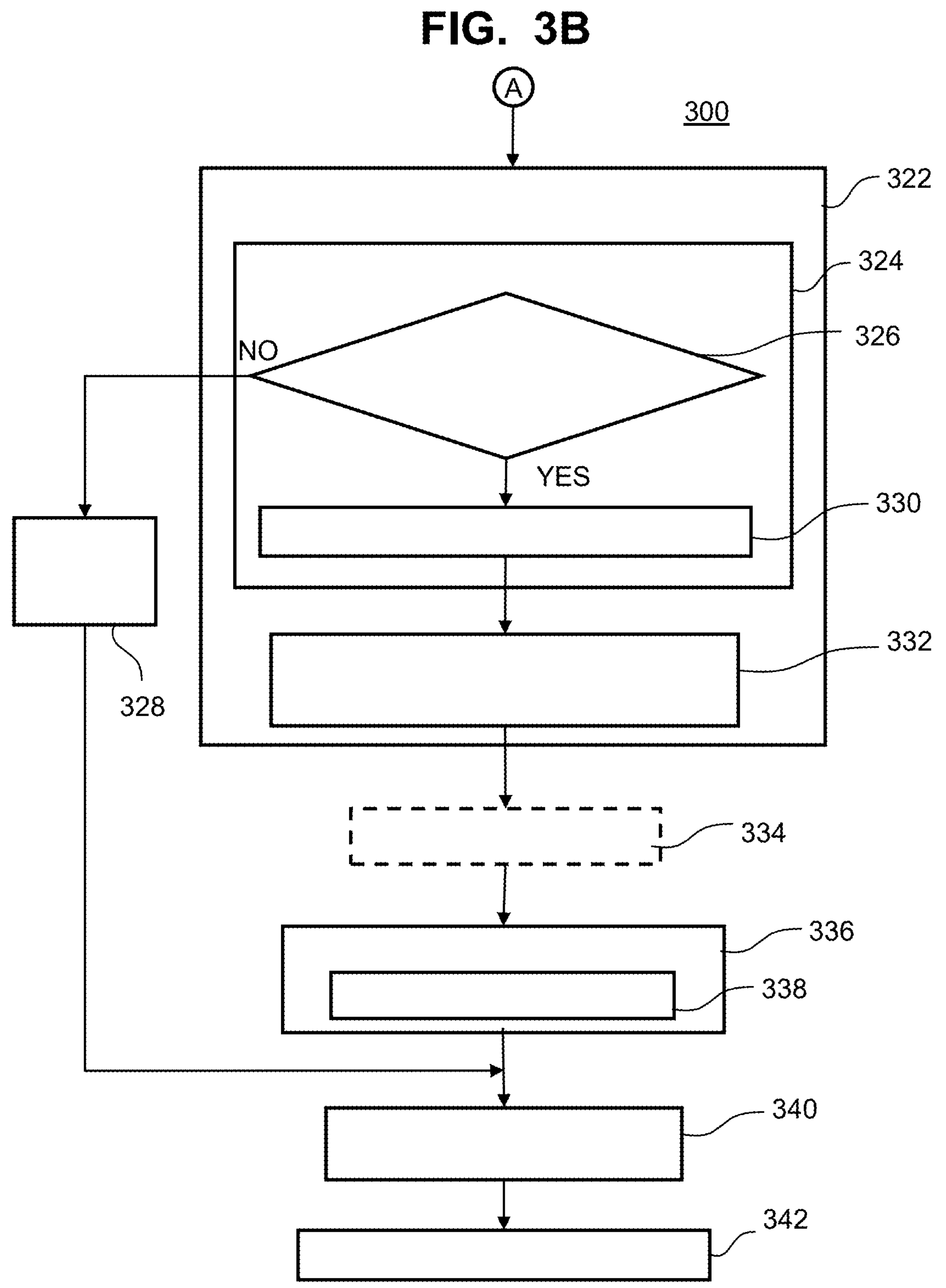

Referring to FIGS. 3A-3B, a process 300 of reducing impact loads at a detected abrupt grade change is provided according to at least one of the implementations described herein. The process 300 is described with operations 302-342 generally numbered evenly. The systems, vehicles, devices, and components of FIGS. 1-2 and 6-7 may be referred to where relevant.

The present process 300 provides for a much smoother ride over abrupt grade changes such as curbs. A smooth ride herein refers to an experience in a vehicle with no or reduced sudden stops, sudden starts, jerking, and jolting that cause startling and uncomfortable motion as perceived and/or felt by an occupant of the vehicle including the feeling of experiencing impact loads from the vehicle. When the drop (and/or rise) of a grade change, such as at a curb at an end of a driveway when entering a street (or road) is sufficiently high or abrupt, the occupants in the vehicle may feel a sudden bump, jolt, or jerk due to impact loads propagated from the wheels of the vehicle. Such an impact load also may originate from the underbody of the vehicle hitting the curb. These situations also may occur during parallel parking when a vehicle is driven up and onto a curb (and back down off of the curb), for example. Since these situations usually occur at very low speeds and relatively small grade change heights, this type of motion is often unharmful to a healthy person. However, people who are impaired and/or unhealthy, either physically or psychologically may have heightened sensitivity to these motions of the vehicle.

Thus, process 300 provides a much smoother ride for occupants. Since process 300 is related to the control of deceleration and speed over an abrupt grade change, process 300 also may be used to protect the underbody of a vehicle, particularly for low underbody vehicles or vehicles carrying heavy loads that lower the vehicle's underbody. The process can be completely autonomous, only control the brake system, or may be manually controlled and simply alert the driver to conditions and a target speed that should be attained for driving over the abrupt grade change.

As to the details of process 300, the process 300 may include "activate abrupt grade change system" 302. By one form, process 300 operates the impact load reduction (ILR) system 200, and the ILR system 200 is activated automatically as soon as the vehicle is turned on. Otherwise, the driver manually activates the ILR system 200 by contacting an activator such as a physical switch or button or virtual activator on a graphical user interface (GUI) on a display in the vehicle. Upon receiving an activation signal from any of these events, the activation unit 202 may immediately initiate the monitoring for abrupt grade changes on a road near the vehicle, or the activation simply awakens the activation unit 202 to wait for additional triggers to begin the monitoring of the road.

So for example, when immediate monitoring is to be performed, the monitoring can begin while the vehicle is not moving. Otherwise, the monitoring may be set to start only when the vehicle is in motion. In this case, the monitoring may begin when any motion is detected from the vehicle's sensors, or may be set to begin when the vehicle reaches a minimum rate, such as 1-2 MPH.

By one form, the monitoring automatically occurs when, and by one form only when, the vehicle is moving below a maximum speed and including zero. Thus, by one example form, this indicates the process 300 may be limited to low speed situations, such as when (1) parking, (2) relatively recent motion upon starting from a stopped position, (3) while decelerating at a low speed or stopping, (4) in a parked or stopped position, and so forth. Otherwise, rather than a maximum speed, the cameras and other sensors and systems may be used to detect the location of the vehicle so that the process 300 can only be used in certain locations, such as off of highways and expressways for example. Alternatively, no such limit may be imposed and the process 300 can be used no matter the current speed of the vehicle or location of the vehicle.

Process 300 may include "detect abrupt grade change" 304, and by an abrupt grade change detection unit 204 by this example. The monitoring for the abrupt grade change can be performed by either a camera unit 206 (which also may be an ADAS unit) or an IMU unit 208. By one form, the vehicle may have the camera unit 206 or the IMU unit, but not both. By other examples, the vehicle may have the camera unit 206 to detect upcoming abrupt grade changes, while the IMU unit 208 may be used when the vehicle is too close to the abrupt grade change where the abrupt grade change is not within the filed of view of one or more cameras on the vehicle.

Figure 6:
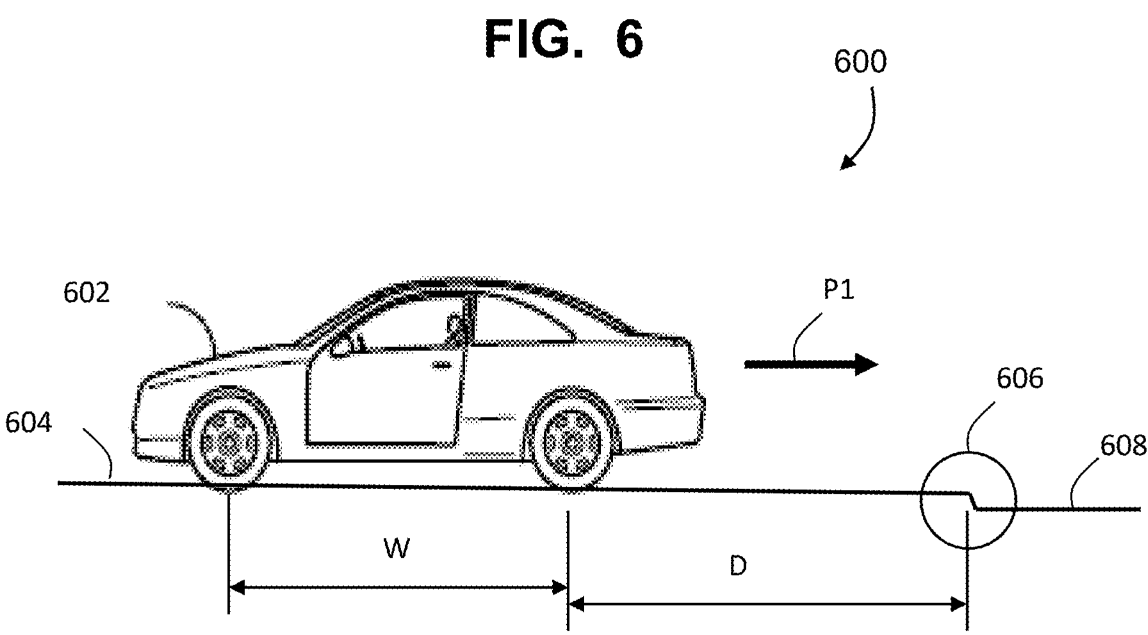
FIG. 6 is a schematic diagram of a side view of a vehicle on a driveway about to drive over a curb and using the system of FIG. 1 according to at least one of the implementations herein.

Referring to FIG. 6, for example, a camera setup or situation 600 may be used with the camera unit 206 to detect a grade change. Here, a vehicle 602 is moving in reverse as shown by arrow P1 and on a driveway 604. The vehicle 602 is approaching a grade change 606 (here being a curb) to get onto a road 608. The wheelbase of the vehicle is labeled W and the distance from the vehicle (here from the closest wheels or axle) to the grade change is labeled D.

Figure 4:
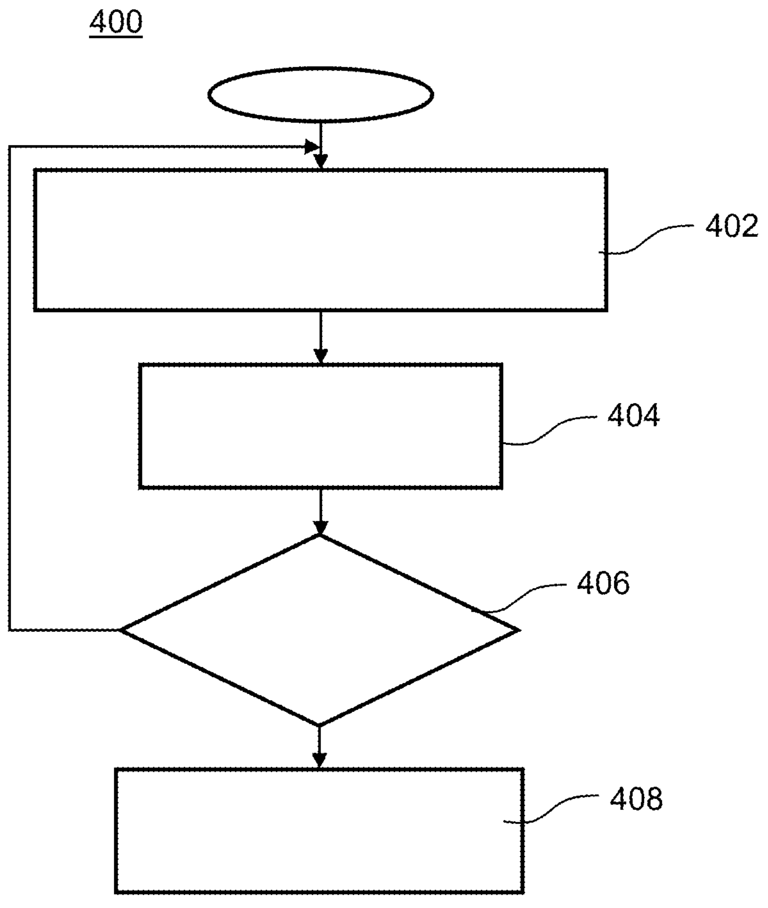
FIG. 4 is an example flow chart of a method of detecting an abrupt grade change used by the method of FIGS. 3A-3B and according to at least one of the implementations herein.

Process 300 may include "use camera imaging" 306, and the details of performing grade change detection with the vehicle cameras are provided on a sub-process 400 (FIG. 4).

Referring to FIG. 4, process 400 may include "monitor road surface for abrupt grade changes using one or more cameras and/or other sensors" 402. The cameras may be used alone without other types of sensors or may be used as part of ADAS operations to at least detect an abrupt grade change in a road, such as curb 606 for example. The cameras capture images of the surrounding environment, and a processor analyzes the images to determine if a grade change exists. This may include the use of all cameras on the vehicle, just front cameras, just rear cameras, or both rear and front cameras, with or without side cameras and surround cameras. Many variations are contemplated. As mentioned above, with an ADAS system, radar, LiDAR, and other types of sensors may be used in conjunction with the cameras.

Once a grade change is detected, the process 400 may include "determine grade change height" 404 to determine whether the grade change is significantly abrupt to warrant impact load reduction operations. By one form, the images and other sensors may be used to measure the height of the grade change using any one or combination of algorithms including triangulation, structure from motion (SfM), time-of-flight algorithms, depth sensor data, feature matching, optical flow, parallax methods, and others.

The process 400 then may include the inquiry "height over a threshold?" 406. By one form, the grade change is considered abrupt if the height is equal to or over about or exactly eight inches. The threshold may vary depending on whether the type of grade change can be determined such as a particular curb shape with known measurements that may have a shallower ramped surface rather than a steep drop step, for example. The threshold also may be determined by experimentation where a certain height is associated with a certain comfort level of occupants in the vehicle as explained below.

If the height of the detected grade change is below the threshold, the process loops back to operation 402 to continue to monitor for an abrupt grade change. However, once the grade change is determined to be abrupt, the process 400 may include "continue with reducing grade change impact loads to vehicle" 408 at operation 312 (FIG. 3).

When the camera (or ASAD) detection is not available for the vehicle, or the vehicle is too close to the curb or grade change, process 300 may include "use inertial measurement unit (IMU)" 308.

Figure 7:
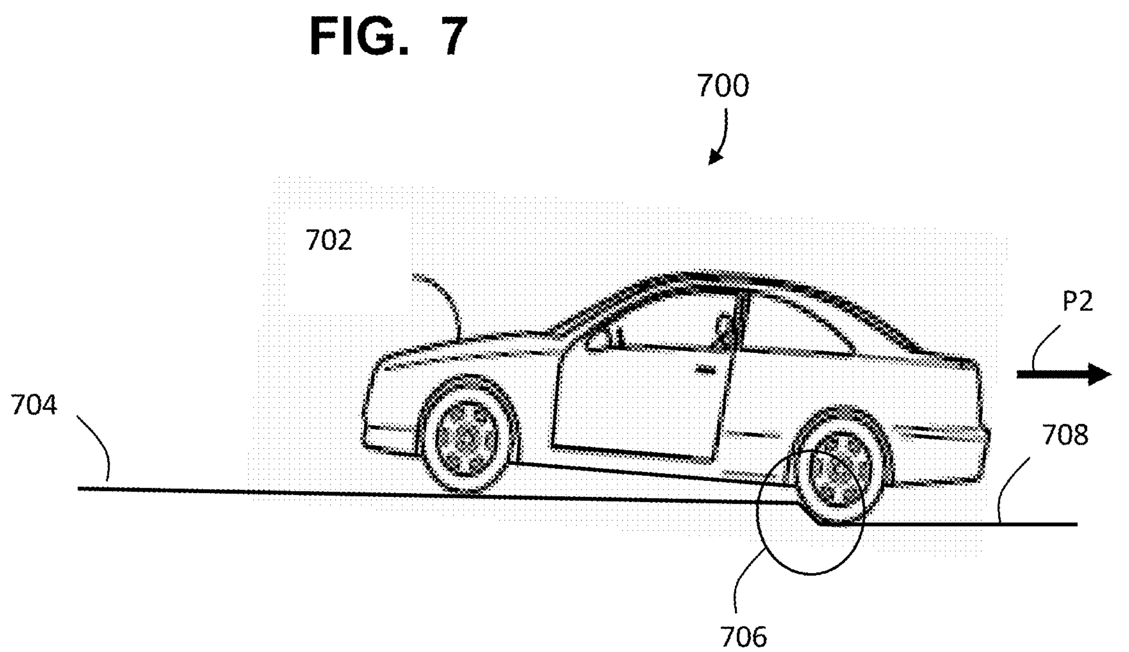
FIG. 7 is a schematic diagram of a side view of a vehicle on a driveway over a curb and using the system of FIG. 1 according to at least one of the implementations herein.

Referring to FIG. 7 as an example, an IMU setup or situation 700 may be used with the IMU unit 208 to detect a grade change. Here, a vehicle 702 is moving in reverse as shown by arrow P2 and on a driveway 704 to move onto a road 708. The vehicle 702 already has its rears wheels on a grade change 706 (here being a curb) to get onto a road 708. In the case of vehicle 702, the rear axle and rear wheels are already over the grade change or curb 706. Also in this case, either the camera unit 206 is not available and only the IMU unit 208 is provided, or the cameras cannot adequately take images of the grade change 706.

Figure 5:
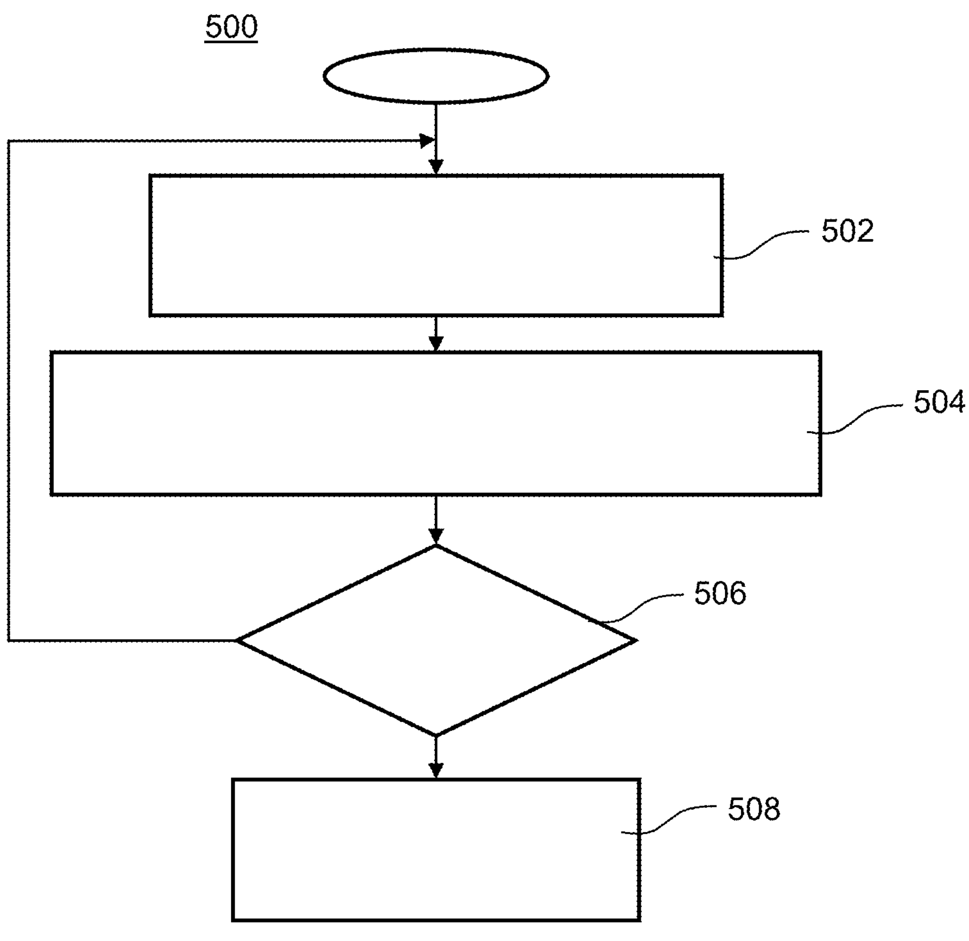
FIG. 5 is an example flow chart of an alternative method of detecting an abrupt grade change used by the method of FIGS. 3A-3B and according to at least one of the implementations herein.

Referring to FIG. 5, the IMU unit 208 may operate a sub-process 500 to detect abrupt grade changes, and may include "monitor road surface for change in pitch and/or roll of vehicle from an inertial measurement unit (IMU)" 502. Thus, the IMU monitors the vehicle for pitch and roll angles for example that may indicate one side or corner of the vehicle is lower than another in such a way that the lower corner or side (or wheel or both wheels on the same axle) may have begun to lower, or is already lowered, into a grade change such as the curb 706.

When the grade change is detected, the process 500 may include "upon change in vehicle orientation, determine suspension height difference before and after grade change was reached" 504. Suspension sensor data may be collected to confirm the contact with the grade change. Such suspension sensors may detect the distance a suspension moves downward (e.g., expands) from a previous position to a current position, and in turn a distance the wheel at the lowered suspension has also lowered into the grade change. A grade change is determined to exist for the IMU-based detection when the confirmation is obtained. The IMU unit 208 may be trained to recognize the IMU data and suspension data combinations that indicate a grade change exists and may output a signal when that occurs to determine the height of the grade change. The height of the suspension drop may be used to determine the grade change height, where it may be assumed to be the same or some proportion of the suspension drop height. Otherwise, the height of the grade change may be determined as described above with operation 404 of process 400.

The process 500 then may include the inquiry "height over a threshold?" 506, where it may be concluded that the grade change is significantly abrupt for more operations as with inquiry 406 of process 400. If the height of the detected grade change is below the threshold, the process loops back to operation 502 to continue to monitor for an abrupt grade change. However, once the grade change is determined to be abrupt, the process 500 may include "continue with reducing grade change impact loads to vehicle" 508 at operation 312 (FIG. 3).

Figure 8:
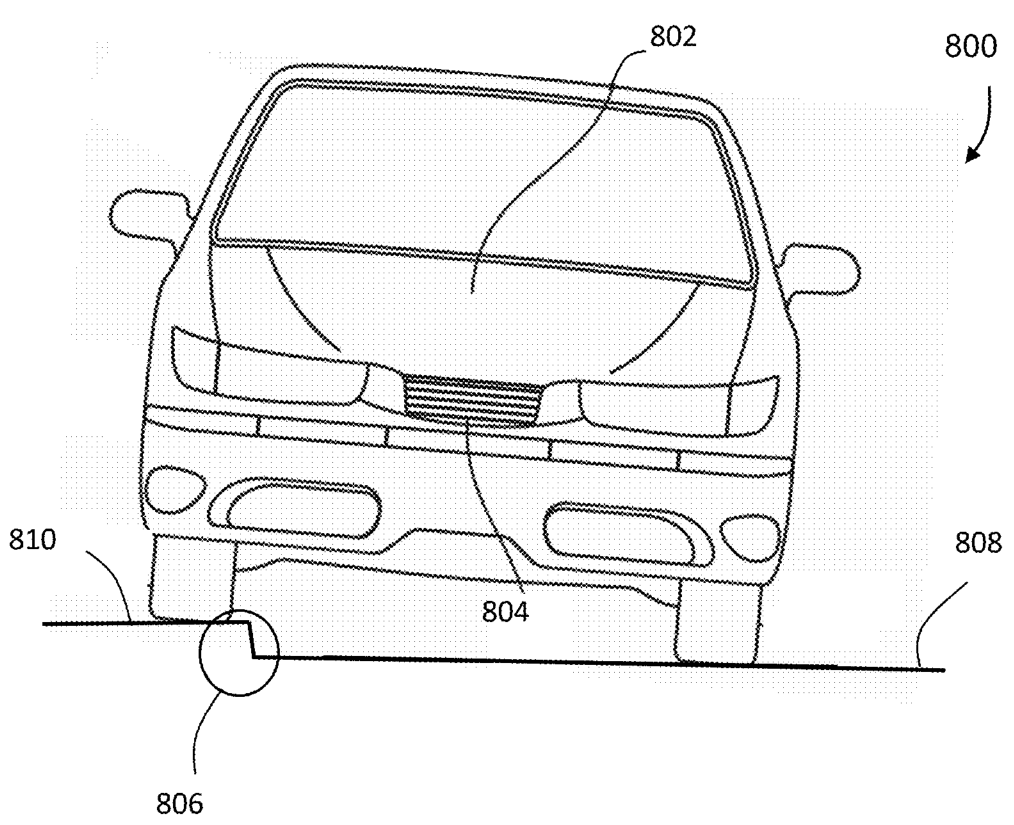
FIG. 8 is a front view of a vehicle having a wheel on a curb during parallel parking and using the system according to at least one of the implementations herein.

Referring to FIG. 8 for yet another alternative, a setup or situation 800 has a vehicle 802 that has driven up and onto a grade change 806 that here is a curb. The front 804 of the vehicle 802 reveals the vehicle 802 has one side higher than the other so that the vehicle 802 is tilted from a higher ground 810 (such as a sidewalk) to a lower street 808 (or road). The IMU unit 208 can also provide the grade change detection in this situation as well due to the change in orientation of the vehicle 802.

Optionally, process 300 may include "activate alert" 310, where the occupants are provided an alert whether in audio over speakers in the vehicle, such as a ring, tone, or other sound, or a human voice announcement. Otherwise, the alert may be visual with lights on the vehicle that blink, or go on or off, or a symbology and/or text is provided on a screen of a display in or on the vehicle.

Process 300 may include "determine target speed at grade change" 312, where the target speed unit 210 determines a desirable target speed of the vehicle to be used at the abrupt grade change to reduce impact loads from driving over the grade change as much as possible. Thus, process 300 may include "use predetermined comfort correlations" 314. This refers to correlations between a target speed of the vehicle and an indicator of expected level of comfort of an occupant of the vehicle as the vehicle travels over the abrupt grade change at the corresponding target speed. The indicators of expected comfort may be determined subjectively or objectively.

For a subjective example, tests or experiments are performed to determine predetermined correlations by having at least one person sit in a vehicle that is driven over a curb or other grade change arrangement at different potential target speeds. By one form, the grade height is fixed at a single height, such as eight inches. This establishes a correlation between target speed and comfort alone. By other forms, the height of the grade change is varied as well so that a set of correlations is based on both comfort level of a person and the height of the grade change. This tests factor acceptable and unacceptable bumps, jerks, discomfort, and so forth for a rider in the vehicle. The data from the people being tested may be in the form of answers to comfort-related questions, such as a request for a comfort rating, for each test run, and/or may include results from medical tests or medical monitoring of people in the tests, such as heart rate monitors for example, that alone or with the question results reveal a level of comfort. Such testing can be used to set both the target speed as well as the grade change height threshold.

It should be noted that the comfort level correlations may be grouped depending on the type of impairment or sensitivity by a person where difference in physical and psychological conditions may cause different reactions to impact loads. Thus, a set or range of correlations may be determined separately for physical difficulties such as chronic pain-sensitivity conditions, neurological causes, and pregnancy, or psychological conditions such as anxieties or sensory-related causes, and so forth to name a few examples. When such customization is available, the user or rider may enter a specifical medical category, such as by a GUI on a display in the vehicle, and into the ILR system 200, and received by the target speed unit 210 to set one or a range of available correlations of target speed and comfort.

For an objective test that indicates comfort levels, it is assumed the higher the grade change, the more discomfort for a person in the vehicle. Thus, the correlations may be set between target speed and height of the grade change alone, or may be combined with any of the subjective indicators mentioned above.

By yet another alternative example, the correlations are determined by using force sensor measurements at seats in a test vehicle with real people or on dummies on seats in the vehicle tested at different abrupt grade change heights and target speeds. In this case, the correlation is between target speed and sensed impact load at the occupant seats, which may be proportional to comfort levels.

It should be noted then that an 'indicator of expected comfort' as the phrase is used herein includes those indicators such as increased impact load, that indirectly indicate a comfort level of a person in addition to, or instead of, subjective answers (or direct indicators) to comfort-related questions by a person used in the testing or medical testing of such individuals that indicate the comfort of the person.

These correlations may be placed on a look-up table and held in a memory or database 155 or 212 for example and by use of the target speed unit 210, for example.

Process 300 may include "predict travel from a vehicle position to a location of the grade change" 316 by a travel prediction unit 214 by one example. Here, the process 300 may include "determine current vehicle speed" 318. The current speed may be determined from the speedometer or other sensor on the vehicle. Process 300 also may include "determine time and/or distance to grade change" 320, and when the vehicle has not yet reached the abrupt grade change and cameras were used to detect the abrupt grade change. In this case, the time to reach the grade change from the current vehicle position is determined at the current speed over a detected distance using the cameras, ADAS, and/or other sensors on the vehicle. When the suspension sensors and IMU detection were used because the vehicle has already reached the abrupt grade change (or at least one of the wheels has started dropping or rising at the abrupt grade change), then just a fixed time is computed that is the time the wheelbase of the vehicle (or a similar time) will pass over the abrupt grade change.

Process 300 may include "determine impact load reduction parameters" 322, and this operation may include "determine deceleration" 324 as performed in the present example by the deceleration unit 216. As a preliminary operation, process 300 may include the inquiry "current speed over a threshold?" 326, where the threshold is the target speed. If the current speed is already below the threshold, then deceleration is not needed. In this case, if the driving is autonomous, the control system 102 simply maintains 328 the same speed over the grade change. When the driving of the vehicle is manual by one optional example, a message may be provided on a display in the vehicle to inform the driver to maintain the vehicle speed at or below the target speed.

When the current speed is above the threshold, the deceleration unit 216 determines deceleration amounts or a deceleration profile to achieve the target speed from the current vehicle speed along the distance (or duration) from the current vehicle position to the grade change location. The deceleration profile may include any one or combination of a linear, exponential, stepwise, and/or adaptive deceleration. For the adaptive deceleration, the deceleration profile may change as sensed conditions at and around the vehicle change as the vehicle is moving toward and/or over the abrupt grade change.

While the computation of the deceleration may start with the change in speed from the current speed to the target speed to compute a linear deceleration profile (or constant rate of deceleration over time) to achieve the desired change in vehicle speed, the final deceleration itself also may consider the occupant comfort during the deceleration. Thus, an aggressive brake profile should be avoided to provide a smooth transition to the target speed. This may include reducing an amount of change of deceleration over time and along the deceleration profile being generated or creating non-linear (non-uniform) deceleration profiles as needed to attempt to avoid a non-smooth (or rough, bumpy, or jerky) ride.

Process 300 may include "factor underbody contact avoidance" 330. Here, damage and forces on the underbody of the vehicle may be avoided, when desired, by setting the target speed and/or deceleration to factor a position (or height) of the underbody of the vehicle. This can be accomplished by using the height of the grade change, the distance to the grade change, and computed expected drop (or rise) in a center of gravity of the vehicle, and in turn an expected drop or rise of the underbody of the vehicle. It can then be estimated if the underbody of the vehicle will contact the grade change (or the curb in these examples). The deceleration can be changed then if contact is being predicted.

Operation 330 also may include an option where the height of the grade change is determined to be greater than the height of the underbody. In this case, the vehicle may be brought to a complete stop, and the driver provided with a warning or alert, and in one form a very strong warning that advises against travel over the grade change, but that can be overcome by the pilot if desired. As noted for the other operations, such as an operation here with a complete stop also may be strictly limited to slow speeds when desired.

Process 300 may include "determine brake torque for the deceleration" 332, where the deceleration amount is converted into a brake torque that is to be applied, such as on a range of available braking torque, or about 200-1000 Newton-meters for example, to slow the vehicle to the target speed.

Process 300 may include "activate alert" 334 and as performed by alert unit 218 by one example, where, by the example approach here, an audio alert or chime may be emitted over speakers in the vehicle, and/or an image may be display on a display screen in the vehicle that informs the occupants that the brakes are about to be, or are currently, automatically applied to reach the target speed. A message such as "Curb Detected-Auto Slow", or other similar messages may be displayed. By an alternative approach, however, the alert may inform the driver to slow the vehicle manually to attain the target speed before reaching the vehicle reaches the abrupt grade change by having the driver press the brake. In this case, no automatic deceleration is applied by the ILR system 200.

Otherwise, however, process 300 may include "automatically apply auto brakes" 336, where the driver assistant or ADAS controls the braking system of the vehicle and automatically applies the brakes according to the computed deceleration profile. This may be performed by the auto braking unit 220 in one example. Specifically, process 300 may include "perform brake blending" 338. Often in the case when the vehicle is moving at a slow speed, the vehicle will already have a brake torque being applied, whether autonomously or manually by a driver, and this can be detected by brake pedal travel sensors for example. Thus, the deceleration to be applied to reach the target speed is from a deceleration amount that is already being applied on the brakes whether manually as a request from a driver or by an autonomous (ADAS) system of the vehicle. By one form, the deceleration unit 216 may have already considered brake blending and the brake blending adjustments may be included in the deceleration profile computed above at operation 324. A brake blend deceleration is performed that may be a gradual braking, whether a fixed uniform rate, or a uniform increase in braking amount and between a current speed of the vehicle and the target speed sufficient to attempt to provide a smooth transition from a current vehicle position to a vehicle position over the grade change, where the smooth transition is without, or has reduced, sudden stops or starts, jerking, or jolting to maximize occupant comfort. Such a resulting deceleration also may have non-uniform deceleration profiles as explained above.

When the ILR system 200 is performing the impact load reduction when the vehicle is not moving or in park, the deceleration computations may be delayed until the vehicle is moved and reaches a speed above the target speed. Thus, if the target speed is never exceeded by the time the vehicle travels over the abrupt grade change, the ILR system 200 may not compute a deceleration profile at all. If the speed of the vehicle does exceed the target speed in such time, then the impact load reducing operations described above are performed.

Process 300 may include "detect end of wheelbase at grade change location" 340. In other words, the wheelbase W (FIG. 6 for example) defines a speed control zone during which, ideally, the target speed is to be obtained. By this example, the ILR system 200 can detect when the first wheel, wheels, or wheel axle (whether front or rear) reaches the location of the abrupt grade change. Thereafter, the length of the wheelbase W to the other or second (front or rear) wheels is known, such as 2.3 meters for a particular vehicle, by one random example.

Process 300 then may include "revert to normal drive mode" 342. After the second wheel axle and wheels at the end of the wheelbase passes the abrupt grade change location, normal driving is then re-activated. This can be performed by simply detecting when the vehicle has moved from the position where the first wheel or wheels were at the abrupt grade change and passed the abrupt grade change location more than the length of the wheelbase so that the second wheel or wheels are also passed the abrupt grade change. Alternatively, the second wheels passing the abrupt grade change can be detected by other methods, such as by inertial sensors, cameras, or other sensors.

While at least one example implementation has been presented in the foregoing detailed description, it should be appreciated that a vast number of variations exist. It should also be appreciated that the example implementations are not intended to limit the scope, applicability, or configuration of the disclosure in any way. Rather, the foregoing detailed description will provide those skilled in the art with a convenient road map for implementing the example implementations. It should be understood that various changes can be made in the function and arrangement of elements without departing from the scope of the disclosure as set forth in the appended claims and the legal equivalents thereof.

What is claimed is:

1. A method, comprising:

automatically monitoring a path in proximity to a vehicle to detect an abrupt grade change along the path and ahead of the vehicle, wherein the grade change is determined to be abrupt depending on a predetermined threshold of a minimum change in grade height, the monitoring comprising:

monitoring ahead in a direction of motion of the vehicle using at least one camera, obtaining data from monitoring a pitch and roll of the vehicle when the vehicle contacts the grade change and using at least one inertial measurement unit (IMU), and in response to the IMU detecting a grade change, confirming the grade change by using suspension sensors to measure a change in height of a wheel of the vehicle;

upon receiving, by processor circuitry forming at least one processor, indication that an abrupt grade change exists, determining a time or distance or both from a position of the vehicle to the abrupt grade change;

determining, by the processor, a target speed the vehicle is to use to travel over the abrupt grade change using predetermined correlations between a target speed of the vehicle and an indicator of expected comfort of an occupant of the vehicle as the vehicle travels over the abrupt grade change, wherein the correlations are between a target speed and a change in grade height, and wherein the correlations change depending on a preset sensitivity of a target occupant of the vehicle;

determining, by the processor, whether a current speed of the vehicle is below the target speed;

automatically, by the processor, decelerating the vehicle so that the vehicle travels over the abrupt grade change at or below the target speed when the current speed is above the target speed; and displaying an alert to the occupant on a display of the vehicle when the abrupt grade change is detected or when the automatic deceleration is to be performed or both, wherein the alert includes the word "curb" or phrase "curb detected".

2. The method of claim 1, wherein the correlations depend on subjective tests with at least one person indicating comfort or discomfort levels depending on the target speed and abrupt grade change heights.

3. The method of claim 1, wherein the correlations depend on force sensor measurements at seats in a vehicle or on dummies on seats in the vehicle tested at different abrupt grade change heights and target speeds.

4. The method of claim 1, comprising detecting the abrupt grade change by using one or more cameras or an advanced driver assistance system (ADAS).

5. The method of claim 1, comprising detecting the abrupt grade change by using an inertial measurement unit (IMU) and suspension sensors that measure a change in height of a suspension at a wheel of the vehicle, wherein the suspension sensors are linked to the suspensions of the vehicle.

6. The method of claim 1, comprising automatically maintaining the current speed of the vehicle when the current speed is below the target speed.

7. The method of claim 1, comprising displaying an alert to the occupant of the vehicle that states "auto slow".

8. The method of claim 1, comprising setting and executing a brake blend deceleration between a current speed of the vehicle and the target speed sufficient to attempt to provide a smooth transition from the current vehicle position to a vehicle position over the abrupt grade change.

9. The method of claim 1, wherein the correlations are set by receiving a selection of one of multiple available different physical or psychological sensitivities listed on a graphical user interface (GUI) on the vehicle;

wherein determining the target speed or decelerating the vehicle includes factoring a position of the underbody of the vehicle, and the method comprises:

comparing a detected change in grade height to a height of an underbody of the vehicle, and in response to the comparison, either (a) automatically stopping the vehicle or (b) providing an alert to avoid travel over the grade change on a display on the vehicle to show to an occupant in the vehicle.

10. A computing device, comprising:

memory storing predetermined correlations between a target speed of a vehicle and an indicator of expected comfort of an occupant of the vehicle as the vehicle travels over an abrupt grade change, wherein the correlations are set by receiving a selection of one of multiple available different physical or psychological sensitivities listed on a graphical user interface (GUI) on the vehicle; and processor circuitry forming one or more processors being communicatively coupled to the memory, the processor to operate by:

automatically monitoring a path in proximity to the vehicle to detect the abrupt grade change along the path and ahead of the vehicle, wherein the grade change is determined to be abrupt depending on a predetermined threshold of a minimum change in grade height, upon receiving indication that an abrupt grade change exists, determining a time or distance or both from a position of the vehicle to the abrupt grade change, determining a target speed the vehicle is to use to travel over the abrupt grade change using the predetermined correlations, determining whether a current speed of the vehicle is below the target speed, and automatically decelerating the vehicle so that the vehicle travels over the abrupt grade change at or below the target speed when the current speed is above the target speed.

11. The device of claim 10, wherein the processor is arranged to operate by: reverting back to a non-abrupt grade change mode when the processor detects an end of a wheelbase of the vehicle passed over the abrupt grade change.

12. The device of claim 10, wherein the monitoring comprises alternatively using both an optical device to analyze images of the path up ahead and using an inertial measurement unit (IMU) and suspension sensors to detect when the vehicle is on a location of the abrupt grade change.

13. The device of claim 10, wherein the processor further operates by displaying the target speed on a display device on the vehicle and to a driver of the vehicle and informing the driver to maintain the target speed or less.

14. The device of claim 10, wherein the sensitivities include at least physical difficulties, chronic pain-sensitivity conditions, neurological causes, pregnancy, psychological conditions, anxieties, and sensory-related causes.

15. The device of claim 10, wherein wherein the monitoring comprises:

monitoring ahead in a direction of motion of the vehicle using at least one camera, monitoring a pitch and roll of the vehicle when the vehicle contacts the grade change using at least one inertial measurement unit (IMU), and in response to the IMU detecting a grade change, confirming the grade change by using suspension sensors to measure a change in height of a wheel of the vehicle; and wherein determining the target speed or decelerating the vehicle includes factoring a position of the underbody of the vehicle, and the processor is arranged to operate by:

comparing a detected change in grade height to a height of an underbody of the vehicle, in response to the comparison, automatically stopping the vehicle; and displaying an alert to the occupant of the vehicle when the abrupt grade change is detected or when the automatic deceleration is to be performed or both, wherein the alert includes the word "curb" or phrase "curb detected".

16. A vehicle, comprising:

one or more controllers, comprising:

memory; and processor circuitry forming one or more processors communicatively coupled to the memory, wherein the processor is to operate by:

automatically monitoring a path in proximity to the vehicle to detect an abrupt grade change along the path and ahead of the vehicle, wherein the grade change is determined to be abrupt depending on a predetermined threshold of a minimum change in grade height, upon receiving indication that an abrupt grade change exists, determining a time or distance or both from a position of the vehicle to the abrupt grade change, determining a target speed the vehicle is to use to travel over the abrupt grade change using predetermined correlations between a target speed of the vehicle and an indicator of expected comfort of an occupant of the vehicle as the vehicle travels over the abrupt grade change, determining whether a current speed of the vehicle is below the target speed, and automatically decelerating the vehicle so that the vehicle travels over the abrupt grade change at or below the target speed when the current speed is above the target speed, wherein determining the target speed or decelerating the vehicle includes factoring a position of the underbody of the vehicle; and comparing a detected change in grade height to a height of an underbody of the vehicle, and in response to the comparison, either (a) automatically stopping the vehicle or (b) providing an alert to avoid travel over the grade change on a display on the vehicle to show to an occupant in the vehicle, wherein the monitoring comprises:

monitoring ahead in a direction of motion of the vehicle using at least one camera, monitoring a pitch and roll of the vehicle when the vehicle contacts the grade change using at least one inertial measurement unit (IMU), and in response to the IMU detecting a grade change, confirming the grade change by using suspension sensors to measure a change in height of a wheel of the vehicle;

wherein the correlations are set by receiving a selection of one of multiple available different physical or psychological sensitivities listed on a graphical user interface (GUI) on the vehicle, wherein the sensitivities include at least physical difficulties, chronic pain-sensitivity conditions, neurological causes, pregnancy, psychological conditions, anxieties, and sensory-related causes; and the processor is arranged to operate by:

displaying an alert to the occupant of the vehicle when the abrupt grade change is detected or when the automatic deceleration is to be performed or both, wherein the alert includes the word curb or the phrase curb detected.

17. The vehicle of claim 16, wherein the decelerating comprises automatically generating a deceleration profile set to be a uniform deceleration rate from the current speed of the vehicle to the target speed.

18. The vehicle of claim 16, wherein the decelerating includes automatically generating a deceleration profile varied to attempt to avoid sudden stops and jolts of the vehicle.

* * * * *